(12) United States Patent
Nallagonda et al.

(10) Patent No.: US 12,007,883 B2
(45) Date of Patent: Jun. 11, 2024

(54) AUTOMATED METHOD AND SYSTEM FOR FINDING VULNERABILITIES IN A PROGRAM USING FUZZING

(71) Applicant: Tata Consultancy Services Limited, Mumbai (IN)

(72) Inventors: Harshita Vani Nallagonda, Hyderabad (IN); Siddhasagar Pani, Bangalore (IN); Vigneswaran Ramachandran, Chennai (IN); Raveendra Kumar Medicherla, Bangalore (IN); Rajan Mindigal Alasingara Bhattachar, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 97 days.

(21) Appl. No.: 18/058,662

(22) Filed: Nov. 23, 2022

(65) Prior Publication Data
US 2023/0214318 A1 Jul. 6, 2023

(30) Foreign Application Priority Data

Jan. 3, 2022 (IN) .............................. 202221000233

(51) Int. Cl.
*G06F 9/44* (2018.01)
*G06F 11/36* (2006.01)
(52) U.S. Cl.
CPC ...... *G06F 11/3692* (2013.01); *G06F 11/3696* (2013.01)
(58) Field of Classification Search
CPC .................................................. G06F 11/3692
(Continued)

(56) References Cited

U.S. PATENT DOCUMENTS

| | | | |
|---|---|---|---|
| 8,756,460 B2* | 6/2014 | Blue | G06F 11/3676 714/38.1 |
| 10,534,701 B1* | 1/2020 | Pande | G06F 16/284 |

(Continued)

OTHER PUBLICATIONS

Babić, Domagoj et al., "FUDGE: Fuzz Driver Generation at Scale", Proceedings of the 2019 27th ACM Joint Meeting on European Software Engineering Conference and Symposium on the Foundations of Software Engineering, Date: Aug. 2019, pp. 975-985, Publisher: ACM, https://storage.googleapis.com/pub-tools-public-publication-data/pdf/d92eead1d1b76495e7cc148adf249ea50f3b881e.pdf.

*Primary Examiner* — Evral E Bodden
(74) *Attorney, Agent, or Firm* — FINNEGAN, HENDERSON, FARABOW, GARRETT & DUNNER LLP (57) ABSTRACT

A method and system for finding vulnerabilities in a program using fuzzing have been provided. The disclosure provides a vulnerability detection framework using a language agnostic single fuzzer that can fuzz smart contracts written in different programming languages. The idea here is that a smart contract written in a high-level language is converted/compiled into an LLVM intermediate representation (LLVM IR) code and then perform the fuzzing on this LLVM IR code instead of fuzzing smart contract source code directly. The process of generating fuzz driver, report driver is automated by handling the standardization issue by carefully dividing the smart contracts into categories. The present disclosure is proposing processes of automation of fuzz or report driver generation. Further the language agnostic feature (done with intermediate representation) is also achieved. Further profiling is achieved which processes fuzzer output and generates meaningful data points.

11 Claims, 5 Drawing Sheets

(58) Field of Classification Search
USPC .......................................................... 717/124
See application file for complete search history.

(56) References Cited

U.S. PATENT DOCUMENTS

| | | | |
|---|---|---|---|
| 10,586,053 B2* | 3/2020 | Kim | G06F 11/3684 |
| 10,747,517 B2* | 8/2020 | Bequet | G06F 16/9014 |
| 2011/0078798 A1* | 3/2011 | Chen | H04L 63/1433 |
| | | | 719/330 |

* cited by examiner

AUTOMATED METHOD AND SYSTEM FOR FINDING VULNERABILITIES IN A PROGRAM USING FUZZING

PRIORITY CLAIM

This U.S. patent application claims priority under 35 U.S.C. § 119 to: Indian Patent Application No. 202221000233, filed on 3 Jan. 2022. The entire contents of the aforementioned application are incorporated herein by reference.

TECHNICAL FIELD

The disclosure herein generally relates to the field of vulnerability analysis, and, more particularly, to a method and system for finding vulnerabilities in a program using fuzzing for blockchain applications.

BACKGROUND

Ever since the advent of the bitcoin blockchain, it has triggered a plethora of applications in the digital world (finance, currency management, healthcare services, automotive, construction management, aviation, logistics, and telecommunication, etc.), due to its characteristic such as immutability (of ledger), data persistence, anonymity (users/transactions), availability (fault tolerance), verifiability (auditability) and decentralization.

Blockchain based applications backed by smart contracts are becoming increasingly popular in various domains. Smart contracts for the corresponding transactions are written using different languages such as Solidity/Vyper, Go/Java/Node.js, Kotlin for Ethereum, Hyperledger Fabric, R3 Corda blockchain platforms, respectively. The complexity of the smart contract depends on the type of blockchain application deployed. Note that the higher the complexity of the smart contract (business logic), the higher the number of bugs in the smart contract (which are written by the developers). Smart contracts are vulnerable to attacks due to bugs in them and such attacks resulted in huge monetary losses, disruption in operation and so on in the past. The attacks on these blockchain systems due to vulnerabilities manifested by bugs in the smart contracts compromise the confidentiality, integrity, and availability of the blockchain applications.

Fuzz testing is one of the prominent methods used for identifying bugs in blockchain smart contracts. Multiple fuzzers are used for fuzzing smart contracts written in different programming languages. However, maintenance of multiple fuzzers become prohibitively difficult in an enterprise DevOps setup, in terms of skills, time, and efforts required in patching and keeping them up to date.

Also, to do fuzzing, fuzzers need fuzz drivers which prepare the inputs generated by the fuzzers suitable for testing program under test (PUT) APIs. However, writing fuzz drivers is cumbersome, time taking, needs human intervention (thus error prone), may not be complete unless full code is understood. Especially, smart contracts development is evolving, thus there is the lack of standardization in development.

SUMMARY

Embodiments of the present disclosure present technological improvements as solutions to one or more of the above-mentioned technical problems recognized by the inventors in conventional systems. For example, in one embodiment, a system for finding vulnerabilities in a program using fuzzing. The system comprises an input/output interface, a one or more hardware processors and a memory. The input/output interface receives a program under test (PUT) and PUT metadata as input, wherein the PUT is written in a programming language, and receives one or more program fuzzers for testing. The memory is in communication with the one or more hardware processors, wherein the one or more first hardware processors are configured to execute programmed instructions stored in the one or more first memories, to: generate a first modified program using a fuzz and report driver generator, wherein the first modified program comprises PUT along with a signal handling code and a fuzz driver; generate a second modified program using the fuzz and report driver generator, wherein the second modified program comprises PUT along with a corpus triaging code and the report driver; generate an intermediate representation (IR) using the first modified program using a LLVM intermediate representation (LLVM IR) generator, wherein the LLVM IR is using a language specific LLVM frontend; provide an intermediate representation (IR) as an input to the program fuzzer to generate corpus and crashes; and provide the generated corpus and crashes and the second modified program as input to a profiler to generate a plurality of vulnerability parameters indicative of the vulnerability of the program under test and coverage over time, wherein the plurality of vulnerability parameters comprises stack trace, unique crashes, and a first identification time for each crash.

In another aspect, a method for finding vulnerabilities in a program using fuzzing. Initially, a program under test (PUT) and PUT metadata is received as input, via an input/output interface wherein the PUT is written in a programming language. One or more program fuzzers is also received for testing. In the next step, a first modified program is generated using a fuzz and report driver generator, wherein the first modified program comprises PUT along with a signal handling code and a fuzz driver. Similarly, a second modified program is also generated using the fuzz and report driver generator, wherein the second modified program comprises PUT along with a corpus triaging code and the report driver. Further, an intermediate representation (IR) is generated using the first modified program using a LLVM intermediate representation (LLVM IR) generator, wherein the LLVM IR is using a language specific LLVM frontend. In the next step, an intermediate representation (IR) is provided as an input to the program fuzzer to generate corpus and crashes. And finally, the generated corpus and crashes and the second modified program is provided as input to a profiler to generate a plurality of vulnerability parameters indicative of the vulnerability of the program under test and coverage over time, wherein the plurality of vulnerability parameters comprises stack trace, unique crashes, and a first identification time for each crash.

In yet another aspect, one or more non-transitory machine-readable information storage mediums comprising one or more instructions which when executed by one or more hardware processors cause finding vulnerabilities in a program using fuzzing. Initially, a program under test (PUT) and PUT metadata is provided as input, via an input/output interface wherein the PUT is written in a programming language. One or more program fuzzers is also provided for testing. In the next step, a first modified program is generated using a fuzz and report driver generator, wherein the first modified program comprises PUT along with a signal handling code and a fuzz driver. Similarly, a second modified program is also generated using the fuzz and report driver generator, wherein the second modified program comprises PUT along with a corpus triaging code and the report driver. Further, an intermediate representation (IR) is generated using the first modified program using a LLVM intermediate representation (LLVM IR) generator, wherein the LLVM IR is using a language specific LLVM frontend. In the next step, an intermediate representation (IR) is provided as an input to the program fuzzer to generate corpus and crashes. And finally, the generated corpus and crashes and the second modified program is provided as input to a profiler to generate a plurality of vulnerability parameters indicative of the vulnerability of the program under test and coverage over time, wherein the plurality of vulnerability parameters comprises stack trace, unique crashes, and a first identification time for each crash.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Verification of smart contracts is a crucial requirement for secure deployment of blockchain applications. Note that vulnerability detection based on traditional techniques such as static analysis, dynamic analysis, symbolic execution has its pros and cons in terms of infrastructure/skill required, accuracy, and scalability. For instance, dynamic analysis/symbolic execution needs high infrastructure/skill. It provides high accuracy with poor scalability (with respect to code size), whereas static analysis needs relatively less infrastructure/skill and provides low accuracy with relatively good scalability.

To overcome these limitations and to detect vulnerabilities for large-size applications (codes), the fuzzing technique is gaining popularity. It requires relatively less infrastructure/skill and provides high accuracy and good scalability.

In general, the size and complexity of the smart contracts written for enterprise blockchain applications are large and high, respectively. Hence, vulnerability detection techniques based on fuzzing are most suitable. Further, in the enterprise world, the current trend is that they use more than one different blockchain platform to realize their diverse applications. Hence, to enable high assurance of these applications, it is needed to discover and fix their vulnerability due to the underlying bugs in the smart contracts. However, using different fuzzers (such as go-fuzz for Go language) to identify vulnerabilities in the different smart contracts written using different languages can be time-consuming and expensive. Besides, maintenance of multiple fuzzers become prohibitively difficult in an enterprise DevOps setup, in terms of skills, time, and efforts required in patching and keeping them up to date.

The present disclosure provides a method and system for finding vulnerabilities in a program using fuzzing. The present disclosure has been explained with the help of a program or program under test (PUT) taken from a smart contract. It should be appreciated that the program can also be taken from any other source. The disclosure provides a vulnerability detection framework using a language agnostic single fuzzer that can fuzz smart contracts written in different programming languages. The idea here is that a smart contract written in a high-level language is converted/compiled into an LLVM intermediate representation (LLVM IR) code and then the fuzzing is performed on this LLVM IR code instead of fuzzing smart contract source code directly.

The process of generating fuzz driver, report driver is automated by handling the standardization issue by carefully dividing the smart contracts into categories. The present disclosure is proposing processes of automation of fuzz or report driver generation. Further the language agnostic feature (done with intermediate representation) is also achieved. The system helps the enterprises to fuzz test the evolving blockchain smart contracts effortlessly.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
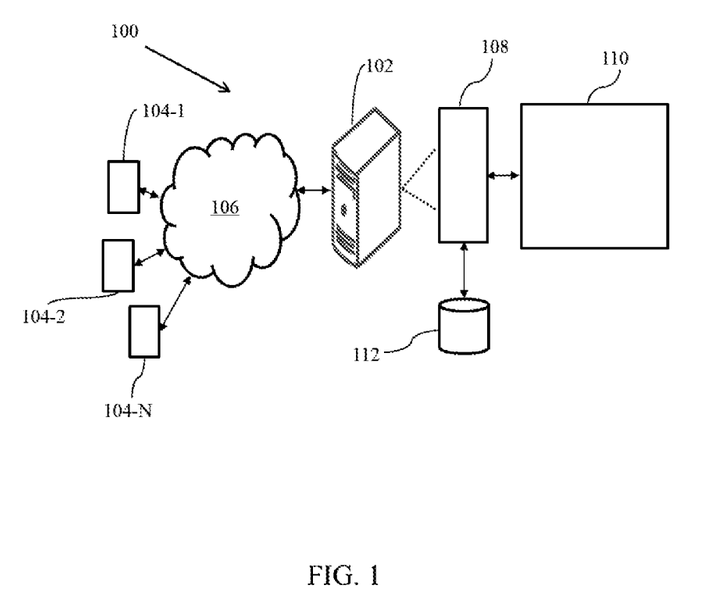
FIG. 1 illustrates a block diagram of a system for finding vulnerabilities in a program using fuzzing according to some embodiments of the present disclosure.

According to an embodiment of the disclosure, FIG. 1 illustrates a block diagram of a system 100 for finding vulnerabilities in a program using fuzzing. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . , collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a fuzz and report driver generator 114, an LLVM IR generator 116, one or more program fuzzers 118 and a profiler 120 as shown in the block diagram of FIG. 2.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the system 100 is configured to receive, a program under test (PUT) and the corresponding PUT metadata as input, via an input/output interface 104. The PUT is written in a programming language. In addition to that the one or more program fuzzers 118 are also provided as the input/output interface 104 for testing. For the sake of clarity, the term "one or more program fuzzers" or "program fuzzer" or "fuzzer" are interchangeable in the present disclosure.

The program fuzzers 118 execute programs under test (PUT) with diverse inputs to find out various exceptions due to underlying vulnerabilities resulting in crashes, memory leaks, assertion failures, and so on. Fuzzing can be classified into three types based on the amount of code instrumentation, ranging from zero, medium, and high, required to test the code, namely black-box, grey-box, and white-box fuzzer, respectively.

The fuzz testing is good at finding surface bugs (bugs that can be discovered along easily reachable code paths). However, it is hard for them (especially for black-box fuzzers) to detect deeper bugs in the code that are buried under nested loops or those that can be triggered only if complex conditions are met. While white-box fuzzing can mitigate this to an extent, it is significantly expensive in terms of resources, language-specific, and requires more profound expertise in language design and engineering. The grey-box fuzzers, on the other hand, are likely to explore deeper pockets of the code when run for extended periods of time. In the present disclosure, for the purpose of testing the smart contracts coverage-guided/mutation-based, grey-box fuzzing has been used. Some of the fuzzing tools allow the process to start with some seed corpus, which may enhance the performance of the program fuzzer at the start. However, choosing a suitable seed corpus is challenging. Besides, choosing a time limit for running the fuzzers to give efficient results is also challenging as different fuzzers perform better while running for a different duration.

Figure 2:
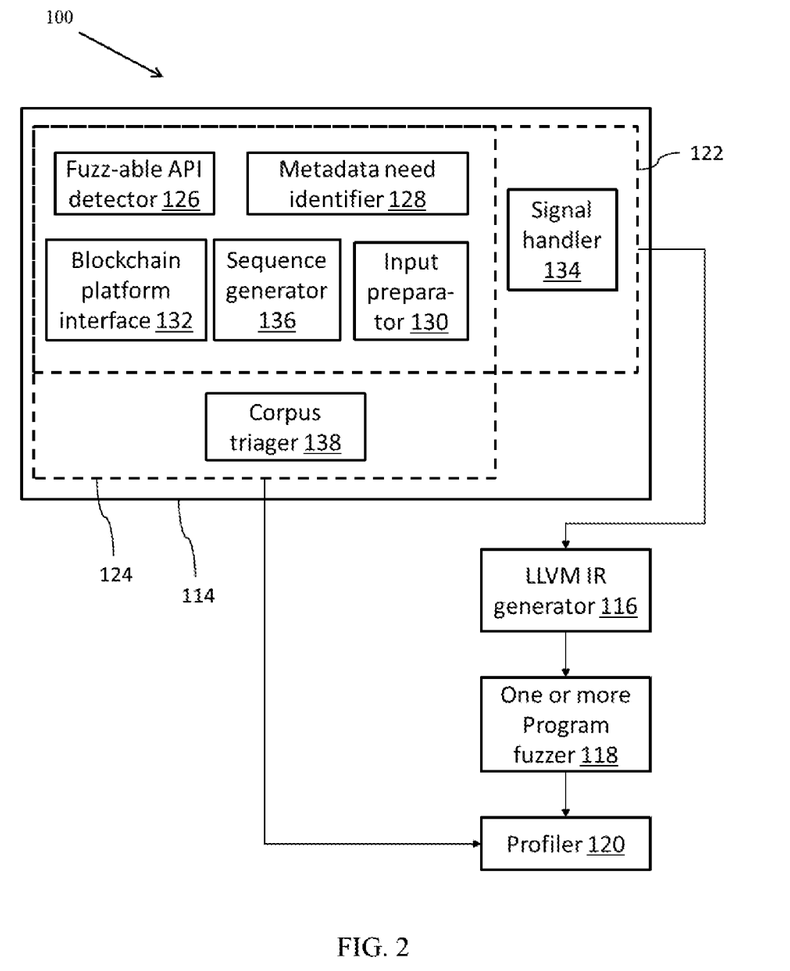
FIG. 2 is a schematic diagram showing the system for finding vulnerabilities in a program using fuzzing according to some embodiments of the present disclosure.

According to an embodiment of the disclosure, the system 100 comprises the fuzz and report driver generator 114. The fuzz and report driver generator 114 further comprises a fuzz driver generator 122 and a report driver generator 124 as shown in FIG. 2. The fuzz driver generator 122 is configured to generate a first modified program. The first modified program comprises PUT along with a signal handling code and a fuzz driver. The report driver generator 124 is configured to generate a second modified program. The second modified program comprises PUT along with a corpus triaging code and the report driver.

The fuzz driver generator 122 is responsible for generating fuzz drivers for the given PUT. It generates fuzz drivers for all the fuzz-able APIs based on predefined templates and the metadata. The fuzz driver generator 122 can generate fuzz drivers with APIs called in a fixed sequential order across multiple executions. The fuzz driver generator 122 further comprises following components:

A fuzz-able API detector 126, configured to traverse the PUT and looks for smart contract APIs that need to be fuzzed. Here, the APIs exposed to outside world (i.e. ones that take input from end-users) are considered for fuzzing.
  A metadata need identifier 128 configured to identify any additional details required to fuzz/test the APIs. This is done based on the APIs signature. If the API input(s) are encapsulated in a complex data structure like argc, argv (array) in C programming, then details needed to fill this complex data structure is requested from the user.
  An input preparator 130 configured to convert the fuzzer generated input/corpus to be used as API testing inputs.
  A blockchain platform inter-facer 132 configured to add necessary stubs to invoke PUT through the platform APIs.
  A signal handler 134 configured to add code responsible for emitting SIGINT or SIGABRT signal by the PUT to identify crashes by the program fuzzer 118.
  A sequence generator 136 configured to add code to invoke PUT APIs in a fixed sequential order.

Figure 3:
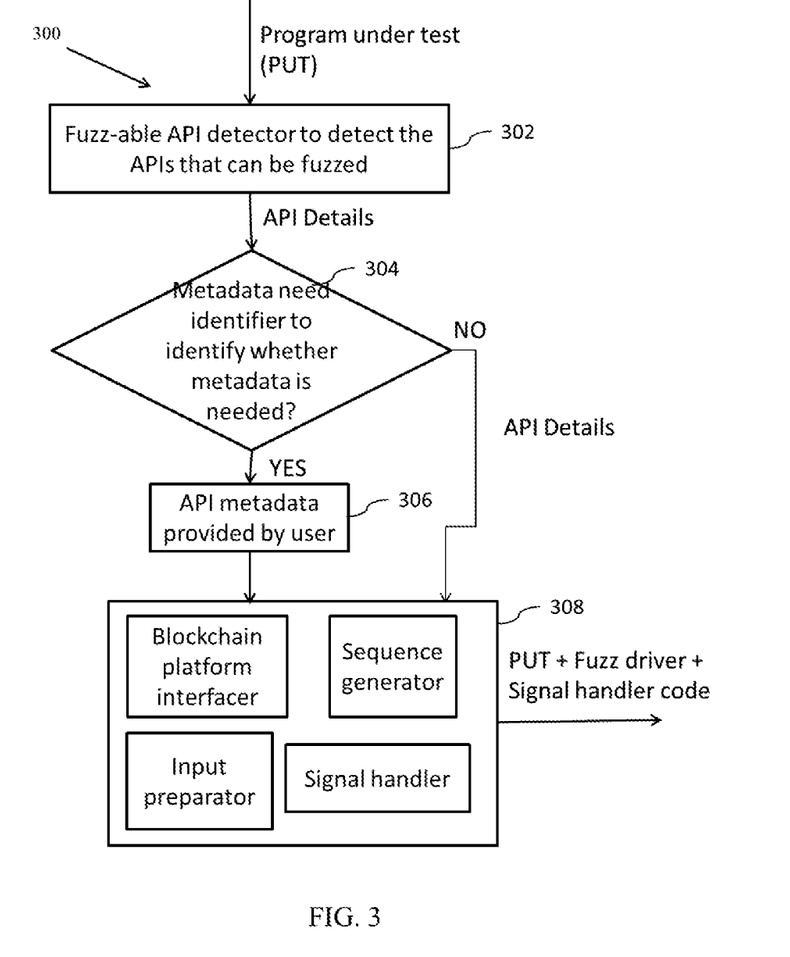
FIG. 3 is a flowchart showing a steps involved in the generation of a first modified output according to some embodiments of the present disclosure.

A flowchart 300 showing steps involved in the generation of the first modified output is shown in FIG. 3. At step 302, the fuzz-able API detector 126 is configured to detect the APIs which can be fuzzed by the program fuzzers 118. The API details for each of the detected plurality of fuzz-able APIs are then provided. At step 304, it is checked if metadata is available for each of the detected plurality of fuzz-able APIs. At step 306, metadata is manually provided by a user, if the metadata is not available. And finally, at step 308 the metadata and API details are provided to remaining components of the fuzz driver generator 122 and the signal handler 134 to generate the first modified program.

According to an embodiment of the disclosure, the report driver generator 124 is similar to the fuzz driver generator 122, but it generates the driver to execute the PUT with corpus and crashes generated by the one or more program fuzzers 118. The report driver generator 124 comprises all the components of the fuzz driver generator 122 except the signal handler 134. In the addition, the report driver generator 124 further comprises a corpus triager 138. The corpus triager 138 is configured to add code responsible for executing the test driver to reproduce the crashes and coverages of the PUT from the corpus and crashers generated by the one or more program fuzzers 118.

Figure 4:
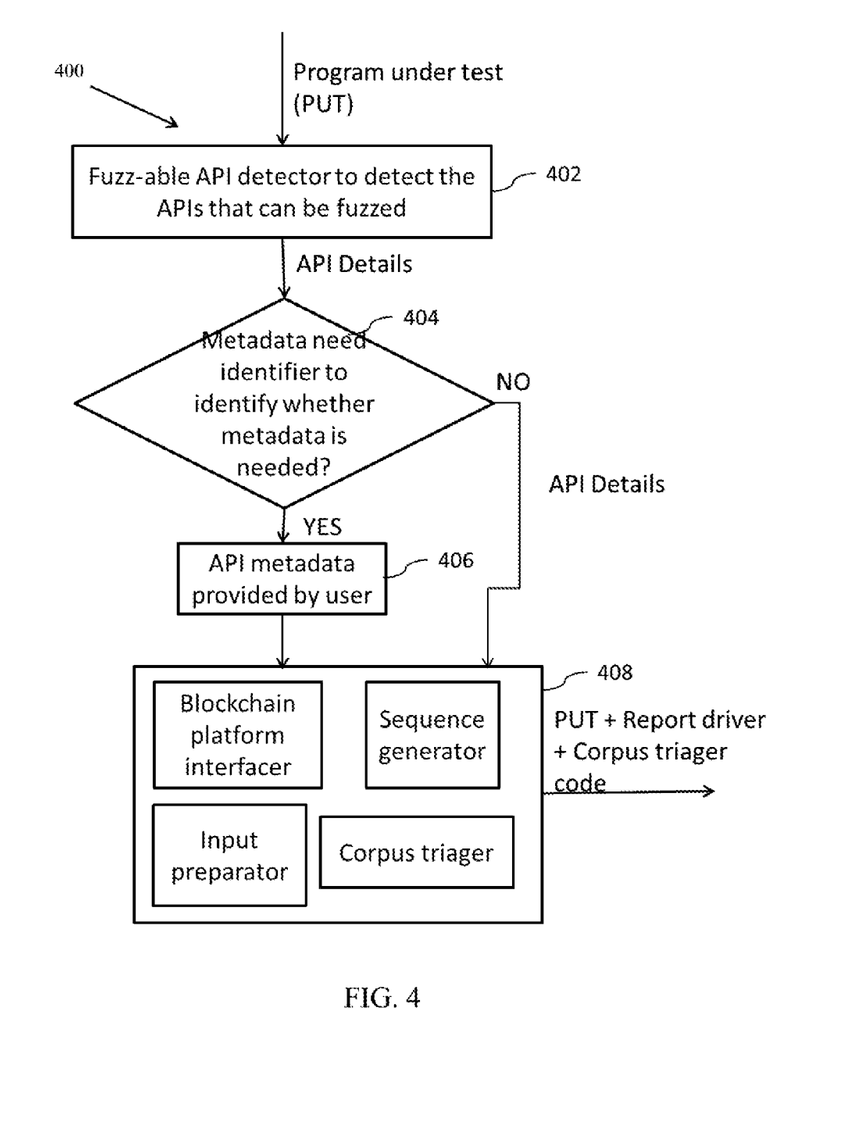
FIG. 4 is a flowchart showing a steps involved in the generation of a second modified output according to some embodiments of the present disclosure.

A flowchart 400 showing a steps involved in the generation of the second modified output is shown in FIG. 4. At step 402, the fuzz-able API detector 126 is configured to detect the APIs which can be fuzzed by the program fuzzers 118. The API details for each of the detected plurality of fuzz-able APIs are then provided. At step 404, it is checked if metadata is available for each of the detected plurality of fuzz-able APIs. At step 406, metadata is manually provided by a user, if the metadata is not available. And finally, at step 408 the metadata and API details are provided to remaining components of the report driver generator 124 and the corpus triager 138 to generate the second modified program.

According to an embodiment of the disclosure, the LLVM IR generator 116 is configured to generate, an intermediate representation (IR) using the first modified program. The LLVM IR is using a language specific LLVM frontend. The LLVM is a collection of compiler technologies. The concept of LLVM intermediate representation (IR) provides a way to convert arbitrary programming languages into SSA (static single assignment) that allows code optimizations in the converted format. LLVM IR-based solutions have been used to fuzz testing. In an example of the present disclosure, a Go language-based smart contracts on Hyperledger Fabric has been used. The LLVM-based Go compiler (Gollvm) was used to compile Go language code into LLVM IR.

According to an embodiment of the disclosure, the one or more program fuzzers 118 are configured to generate corpus and crashes using an intermediate representation (IR) as an input. The program fuzzer 118 generates instrumented fuzz binary from the IR and invokes the corresponding fuzzer. Here, user can choose a general purpose fuzzer from a one or more program fuzzers 118. The corpus comprises the set of inputs that are generated by the program fuzzer 118 to cover the PUT code. The crashes comprise the set of inputs that cause the PUT to crash (getting killed).

According to an embodiment of the disclosure, the system comprises the profiler 120. The profiler 120 is configured to generate a plurality of vulnerability parameters indicative of the vulnerability of the program under test using the generated corpus and crashes and the second modified program as input. The plurality of vulnerability parameters comprises stack trace, unique crashes, and a first identification time for each crash.

The profiler 120 scans through the input files from corpus and sort the input files as per their creation time and runs report driver by feeding input files in a cumulative manner (starting with one input file and then adding one or more files to the input set in every execution) and report coverage over time. The profiler 120 scans through the input files from crashes and sort the files as per their creation time and runs report driver by feeding the input files one by one per execution and report the stack trace, unique crash, and first identification time for the crash.

Figure 5:
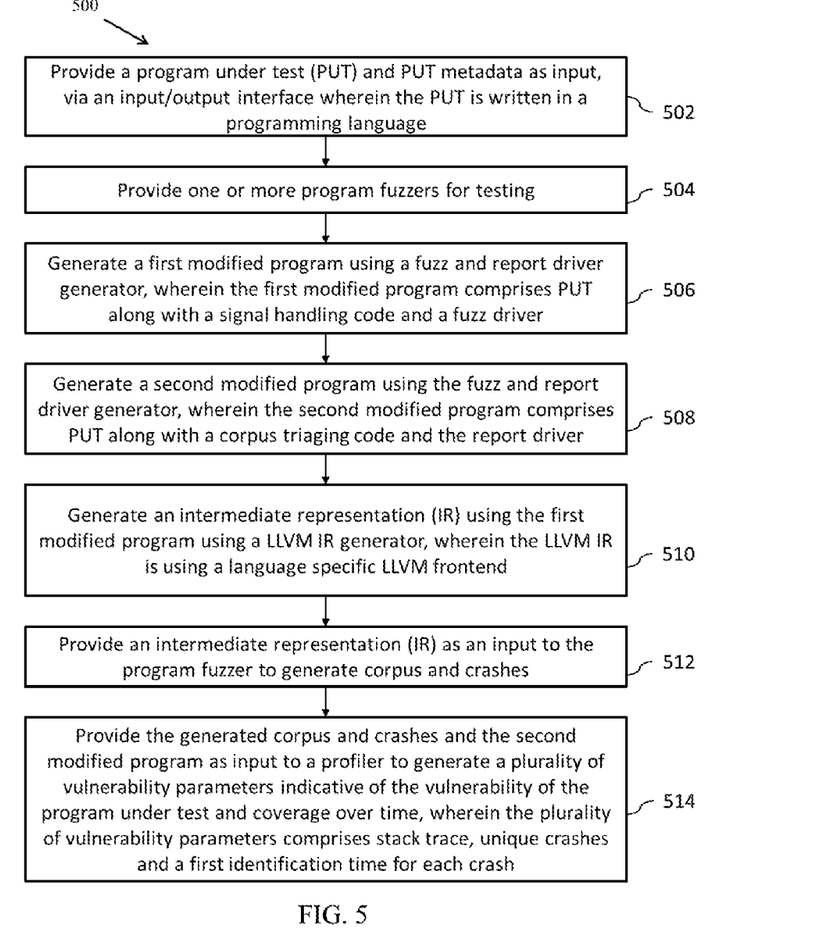
FIG. 5 is a flow diagram illustrating a method for finding vulnerabilities in a program using fuzzing according to some embodiments of the present disclosure.

FIG. 5 illustrates a flow chart of a method 500 for analyzing a plurality of data streams in real time, in accordance with an example embodiment of the present disclosure. The method 500 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 500 are described with help of system 100. However, the operations of the method 500 can be described and/or practiced by using any other system.

Initially at step 502 of the method 500, the program under test (PUT) and the PUT metadata is provided as input, via the input/output interface 104 wherein the PUT is written in a programming language. The method 500 is a language agnostic method and configured to work irrespective of programming language. Similarly, at step 504, one or more program fuzzers 118 are also provided for testing.

Further at step 506 of the method 500, the first modified program is generated using a fuzz and report driver generator, wherein the first modified program comprises PUT along with the signal handling code and the fuzz driver. At step 508, the second modified program is generated using the fuzz and report driver generator 114, wherein the second modified program comprises PUT along with a corpus triaging code and the report driver.

Further at step 510, the intermediate representation (IR) is generated using the first modified program using the LLVM intermediate representation (LLVM IR) generator, wherein the LLVM IR is using the language specific LLVM frontend. At step 512, the intermediate representation (IR) is provided as input to the program fuzzer 118 to generate corpus and crashes. And finally, at step 514, the generated corpus and crashes and the second modified program are provided as input to the profiler 122 to generate a plurality of vulnerability parameters indicative of the vulnerability of the program under test. The plurality of vulnerability parameters comprises stack trace, unique crashes, coverage over time, and a first identification time for each crash.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to fuzz testing in terms of skills, time, and efforts required in identifying vulnerabilities. The embodiment thus provides a method and a system for finding vulnerabilities in a program using fuzzing.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for finding vulnerabilities in a program using fuzzing, the method comprising:
   receiving a program under test (PUT) and PUT metadata as input, via an input/output interface wherein the PUT is written in a programming language;
   receiving, via the input/output interface, one or more program fuzzers for testing;
   generating, via one or more hardware processors, a first modified program using a fuzz and report driver generator, wherein the first modified program comprises PUT along with a signal handling code and a fuzz driver;
   generating, via the one or more hardware processors, a second modified program using the fuzz and report driver generator, wherein the second modified program comprises PUT along with a corpus triaging code and the report driver;
   generating, via the one or more hardware processors, an intermediate representation (IR) using the first modified program using a LLVM intermediate representation (LLVM IR) generator, wherein the LLVM IR utilizes a language specific LLVM frontend;
   providing, via the one or more hardware processors, the intermediate representation (IR) as an input to the program fuzzer to generate corpus and crashes; and
   providing, via the one or more hardware processors, the generated corpus and crashes and the second modified program as input to a profiler to generate a plurality of vulnerability parameters indicative of the vulnerability of the program under test and coverage over time, wherein the plurality of vulnerability parameters comprises stack trace, unique crashes, and a first identification time for each crash.

2. The method of claim 1, wherein generating the first modified program further comprises:
   detecting a plurality of fuzz-able application programmable interfaces (APIs) by traversing the PUT, wherein the detected the plurality of fuzz-able APIs takes input from end-users;
   receiving the API details for each of the detected plurality of fuzz-able APIs
   checking if metadata is available for each of the detected plurality of fuzz-able APIs;
   receiving metadata by a user, if the metadata is not available; and
   providing metadata and API details to remaining components of the fuzz driver generator to generate the first modified program.

3. The method of claim 1, wherein generating the second modified program further comprises:
   detecting a plurality of fuzz-able APIs by traversing the PUT, wherein the detected the plurality of fuzz-able APIs takes input from end-users;
   receiving the API details for each of the detected plurality of fuzz-able APIs;
   checking if metadata is available for each of the detected plurality of fuzz-able APIs;
   receiving metadata by the user, if the metadata is not available; and providing metadata and API details to remaining components of the report driver generator to generate the second modified program.

4. The method of claim 1, wherein the PUT metadata comprises a blockchain platform name, a plurality of API details.

5. The method of claim 1 further comprises a metadata need identifier configured to identify additional details required to fuzz the APIs.

6. The method of claim 1, wherein the corpus comprises a set of inputs generated by the program fuzzer to cover the PUT and the crashes comprises a set of inputs that cause PUT to crash.

7. The method of claim 1, wherein the corpus triaging code is responsible for executing the test driver to reproduce the crash and coverage of PUT from the corpus and crashers generated by the program fuzzer.

8. A system for finding vulnerabilities in a program using fuzzing, the system comprises:
    an input/output interface configured to:
        receive a program under test (PUT) and PUT metadata as input, wherein the PUT is written in a programming language, and
        receive one or more program fuzzers for testing;
    one or more hardware processors; and
    a memory in communication with the one or more hardware processors, wherein the one or more first hardware processors are configured to execute programmed instructions stored in the one or more first memories, to:
        generate a first modified program using a fuzz and report driver generator, wherein the first modified program comprises PUT along with a signal handling code and a fuzz driver;
        generate a second modified program using the fuzz and report driver generator, wherein the second modified program comprises PUT along with a corpus triaging code and the report driver;
        generate an intermediate representation (IR) using the first modified program using a LLVM intermediate representation (LLVM IR) generator, wherein the LLVM IR utilizes a language specific LLVM frontend;
        provide the intermediate representation (IR) as an input to the program fuzzer to generate corpus and crashes; and
        provide the generated corpus and crashes and the second modified program as input to a profiler to generate a plurality of vulnerability parameters indicative of the vulnerability of the program under test and coverage over time, wherein the plurality of vulnerability parameters comprises stack trace, unique crashes, and a first identification time for each crash.

9. The system of claim 8, wherein the generating the first modified program further comprises:
    detecting a plurality of fuzz-able APIs by traversing the PUT, wherein the detected the plurality of fuzz-able APIs takes input from end-users;
    receiving the API details for each of the detected plurality of fuzz-able APIs
    checking if metadata is available for each of the detected plurality of fuzz-able APIs;
    receiving metadata by a user, if the metadata is not available; and
    providing metadata and API details to remaining components of the fuzz driver generator to generate the first modified program.

10. The system of claim 8, wherein the generating the second modified program further comprises:
    detecting a plurality of fuzz-able APIs by traversing the PUT, wherein the detected the plurality of fuzz-able APIs takes input from end-users;
    receiving the API details for each of the detected plurality of fuzz-able APIs
    checking if metadata is available for each of the detected plurality of fuzz-able APIs;
    receiving metadata by a user, if the metadata is not available; and
    providing metadata and API details to remaining components of the report driver generator to generate the second modified program.

11. One or more non-transitory machine-readable information storage mediums comprising one or more instructions which when executed by one or more hardware processors cause:
    receiving a program under test (PUT) and PUT metadata as input, via an input/output interface wherein the PUT is written in a programming language;
    receiving, via the input/output interface, one or more program fuzzers for testing;
    generating, a first modified program using a fuzz and report driver generator, wherein the first modified program comprises PUT along with a signal handling code and a fuzz driver;
    generating, via the one or more hardware processors, a second modified program using the fuzz and report driver generator, wherein the second modified program comprises PUT along with a corpus triaging code and the report driver;
    generating, via the one or more hardware processors, an intermediate representation (IR) using the first modified program using a LLVM intermediate representation (LLVM IR) generator, wherein the LLVM IR utilizes a language specific LLVM frontend;
    providing, via the one or more hardware processors, the intermediate representation (IR) as an input to the program fuzzer to generate corpus and crashes; and
    providing, via the one or more hardware processors, the generated corpus and crashes and the second modified program as input to a profiler to generate a plurality of vulnerability parameters indicative of the vulnerability of the program under test and coverage over time, wherein the plurality of vulnerability parameters comprises stack trace, unique crashes, and a first identification time for each crash.

\* \* \* \* \*